United States Patent [19]

Jonsson et al.

[11] Patent Number: 4,935,841
[45] Date of Patent: Jun. 19, 1990

[54] PRESSURE SENSOR

[75] Inventors: Staffan Jonsson, Sollentuna, Sweden; Ray Olsson, Åland, Finland

[73] Assignees: Johnsson & Billquist Development AB, Stockholm, Sweden; Hydrolab AB, Aland, Finland

[21] Appl. No.: 411,501
[22] PCT Filed: Feb. 11, 1989
[86] PCT No.: PCT/SE88/00049
 § 371 Date: Oct. 4, 1989
 § 102(e) Date: Oct. 4, 1989
[87] PCT Pub. No.: WO88/06281
 PCT Pub. Date: Aug. 25, 1988

[30] Foreign Application Priority Data

Feb. 12, 1987 [SE] Sweden .............................. 8700556-7

[51] Int. Cl.$^5$ ........................... G01L 9/12; H01G 7/00
[52] U.S. Cl. ........................................ 361/283; 73/724
[58] Field of Search ................... 361/283; 73/718, 724

[56] References Cited

U.S. PATENT DOCUMENTS 4,562,742 1/1986 Bell ........................................ 73/718
4,875,134 10/1989 Kuisma ............................. 73/718 X Primary Examiner—Donald A. Griffin
Attorney, Agent, or Firm—Limbach, Limbach & Sutton

[57] ABSTRACT

A capacity pressure sensor having a housing and a diaphragm. The housing and the diaphragm are substantially flat and are connected to each other at an upstanding border at the periphery of the housing. In the hermetically closed space between the housing and said diaphragm a reference pressure is applied. In a pressure measurement the diaphragm is bent inwards relative to said housing depending on the pressure acting on the surface of said diaphragm. This bending inwards is a primary output signal which capacitively can be converted to an electrical signal. Inside the pressure sensor on the inner surfaces of said housing and said diaphragm there are arranged, for the detection of the position of said diaphragm relative to said housing, capacitor plates connected to an electrical measuring circuit for detection of the capacity of the capacitor formed thereby. To enhance the linearity of the measuring capacitor the outer flat surfaces of the pressure sensor are coated with conducting layers connected to earth. Furthermore, in the housing a recess is arranged which when given suitable dimensions further reduces the deviation of the pressure sensor from the desired linear characteristic.

4 Claims, 1 Drawing Sheet

PRESSURE SENSOR

TECHNICAL FIELD

The present invention is related to a capacitive pressure sensor.

BACKGROUND OF THE INVENTION

Capacitive pressure sensors of the type concerned with herein consist of a hermetically closed housing having a reference pressure therein. One side of the housing has the shape of a flexible diaphragm. On the diaphragm a capacitor electrode is located and on an opposite surface, inside the housing, another capacitor electrode is located. Both of the capacitor electrodes are connected to an electrical measuring circuit. When the pressure acting on said diaphragm varies the diaphragm is flexed. Thereby the distance between said both capacitor electrodes is varied whereby the magnitude of the capacity will vary in the capacitor formed by these two capacitor electrodes. Other locations of said electrodes are also possible.

For a pressure sensor of this type the capacitance of the capacitor electrodes is composed of a capacitance varying inversely proportionally to the distance between the capacitor electrodes and a further partial capacitance, not varying in this way and deriving, from among other things, stray capacitances and border effects in the flat capacitor formed by said electrodes. When the capacitance of the capacitor electrodes is measured in order to obtain a measure of the bending of said diaphragm and consequently of value of the pressure acting on said diaphragm this further partial capacitance is a source of errors.

Pressure sensors of this prior art type are described in e.g. U.S. Pat. No. 4 207 504, and U.S. Pat. No. 3 948 102.

To reduce said further partial capacitance and simultaneously constitute an electrical shielding of said capacitor electrodes it is previously known to provide a conducting layer on the outer surface of the pressure sensor, see for instance US A 3 858 097, EP AI 0 095 966, US A 3 750 476, though these documents do not directly describe a pressure sensor of the type set forth above. Thus the first of these documents is concerned with flat pressure sensors having two equally thick diaphragms located adjacent to one another and the third document is concerned with a pressure sensor having a cylindrical diaphragm.

SUMMARY OF THE INVENTION

However, it has been shown that error-producing partial capacitance can be reduced even more and the linearity of the pressure sensor be increased even more, as is proposed according to the invention by, providing in said thicker housing a recess adjacent to an electrode located inside said housing. This recess will also then be coated with a conducting material. The bottom of said recess is preferably flat and parallel to the adjacent capacitor electrode. The lateral width of said bottom surface, moreover, should be larger than said adjacent capacitor electrode.

It can be emphasized that said recess is not allowed to be so deep that the remaining material in said housing or the thickest part of the sensor also will operate as a flexible diaphragm. Further the recess has a diameter being maximally 2.5 of the diameter of said adjacent capacitor electrode. The recess further has conveniently the same shape as the adjacent capacitor plate, i.e. it is in most cases circular or cylindrical.

By the fact that the electrically conducting layer of the surrounding metal shielding, due to said recess, will be located more closely to one electrode the electrical conditions around this capacitor electrode will be more homogeneous. It can be supposed that this causes the mentioned effect of significantly improving the linearity of the pressure sensor.

DESCRIPTION OF THE FIGURES

In FIGS. 1 to 4 is illustrated how the electrical shielding of a capacitive pressure sensor can be realized. Thus, in FIGS. 1 and 2 is illustrated a capacitive pressure sensor shielded according to prior art and in FIGS. 3 and 4 is illustrated a pressure sensor according to the invention. The pressure sensor comprises a housing or a bottom portion 101 and a flexible diaphragm 103 connected to each other by a joint 105. The housing 101 is made from significantly thicker material than the diaphragm 103 whereby when the exterior pressure varies substantially only the diaphragm 103 will be bent inwards or outwards. Between the housing 101 and the diaphragm 103 there is a hermetically sealed space 107 in which there is a reference pressure. The joint 105 is arranged on an annular upstanding platform 106 at the border of said base part 101. The housing 101 and the diaphragm 103 has an expanded, essentially flat shape and their large surfaces are essentially parallel. The pressure sensor is shown to be substantially circular symmetrical, this also being valid for the bottom part 101 and the diaphragm 103. However, other shapes are possible, for instance a square or rectangular shape. At the central area of the bottom portion 101 and the diaphragm 103 capacitor electrodes or plates 109 and 111 are located, connected to the exterior of said pressure sensor by means of suitable conducting bridges as 113. These terminals are intended to be connected to a suitable electronical measuring circuit.

Figure 1:
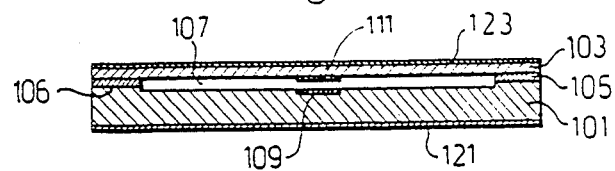
FIG. 1 is a section of a prior art shielded pressure sensor.
Figure 2:
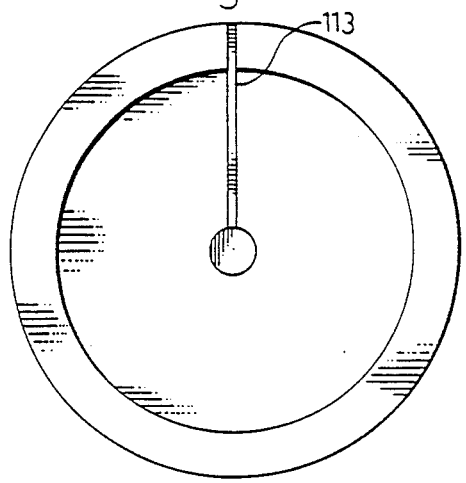
FIG. 2 is a view from above of the housing or the base part of the pressure sensor of FIG. 1.

When the exterior pressure acting on the diaphragm 103 varies, also the position of the diaphragm 103 will vary in relation to the bottom part 101. By means of the capacitor electrodes 109 and 111 and the electronical measuring circuits the position of the diaphragm 103 is detected. In order to reduce the exterior electrical perturbation fields and to reduce stray capacitances included in the total capacitance between the electrodes 109 and 111 the exterior large surfaces of the pressure sensor are coated with layers 121 and 123 of a conducting material. The layers 121 and 123 are thus arranged on the outside of the pressure sensor and on the circular flat opposite surfaces thereof. It is essential that these layers are parallel to the capacitor plates 109 and 111 to form hereby secondary capacitors. These layers 121 and 123 are, on measuring pressure, i.e. when measuring the capacitance of the capacitor formed by the capacitor electrodes 109 and 111, connected to ground. By the fact that the pressure sensor essentially has a disc shape, i.e. it has large dimensions in all directions except in the vertical direction, the grounded layers 121 and 123 will operate like a Faraday cage. By reducing the stray capacitances this prior art pressure sensor is given a good linearity, i.e. the inverse proportion of or the product of the exterior pressure acting on said diaphragm 103 and the capacitor of the capacitor formed by the electrodes 109 and 111 is conveniently constant in the measuring range.

Figure 3:
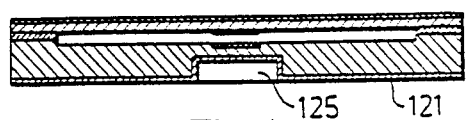
FIG. 3 is a section of a shielded pressure sensor according to the invention and FIG. 4 is a view from above of the base portion of the pressure sensor of FIG. 3.
Figure 4:
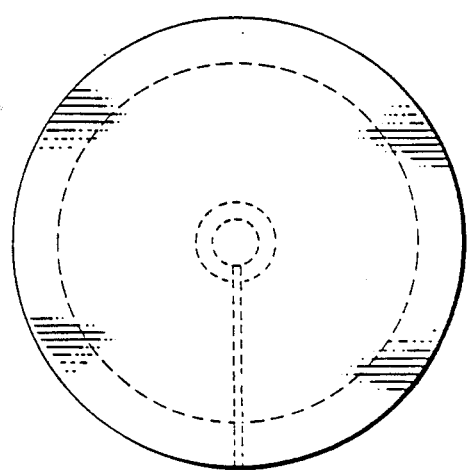

As is mentioned above the bottom part 101 is realized as significantly thicker, i.e. it has a larger transverse thickness than the diaphragm 103. Since the conducting layer 121 on the lower side of the bottom part 101 hereby will be placed at a larger distance from the capacitor electrode 109 than what is the case for the layer 123 on the diaphragm 103 and the upper capacitor electrode 111, the lower secondary capacitor, formed by the capacitor electrode 109 on the base part and the lower layer 121, not as active as the upper secondary condensor, formed by the capacitor electrode 111 on said diaphragm and the upper layer 123. According to the invention the linearity may be improved even more by realizing a recess 125 centrally in the lower surface of said base part 101, as is shown in FIGS. 3 and 4. This recess is circular and the walls and the bottom of said recess are covered by the conducting layer 121. The bottom of the recess 125 furthermore is parallel to the capacitor electrodes and preferably has a larger lateral extension than these. The recess 125 will thus preferably be given the shape of a low circular cylinder or it has substantially and generally the same diametrical shape as the housing 101. Hereby, the electrical conditions around the capacitor electrodes 109 and 111 will be more homogeneous, i.e. the lower and the upper secondary condensors will be more similar to each other, while the stability of the housing will not be effected too much.

The invention will be further described hereinafter by means of the following examples.

EXAMPLE 1

For a pressure sensor intended for the measuring range of 0.1 to 1000 torr the lower part and the diaphragm were realized from glass ceramics, e.g. of the type commercialized with the name "MACOR" by Dow Corning. The diametre of the pressure sensor was 38 mm and the active inwards (or outwards) bendable surface of the diaphragm had the diameter of 30 mm. The thickness of the diaphragm was 0.58 mm and the thickness of the base part was 5 mm. On the base part a centrally located electrode was arranged having the diameter 5.5 mm, placed in a shallow recess having the depth of 0.02 mm and the diameter of 6 mm. On the bottom side there was a cylindrical, centrally located recess having the diameter of 12 mm and the depth of 4 mm whereby the thickness of the material of the base part adjacent to said electrode was about 1 mm.

EXAMPLE 2

A pressure sensor intended for the measuring range of 0.01 to 100 torr was realized as the pressure sensor of Exemple 1 except that the thickness of the diaphragm was 0.28 mm.

EXAMPLE 3

A pressure sensor intended for the measuring range 0.001 to 10 torr was realized as the pressure sensor of Example 2 except that the outer diameter of the pressure sensor was 61 mm, the diameter of the active surface of the diaphragm was 53 mm, the thickness of the base part was 8 mm and the recess in the bottom of said base part had a depth of 7 mm.

All of the exterior surfaces of the pressure sensor were coated with a grounded conductive layer. The electrode at the membrane was centrally located having a diameter being in the order of 1 mm larger than the diameter of the electrode of said base part.

These pressure sensors offered a high degree of linearity within their respective measuring ranges. Those very small deviations existing compared to an ideal linear characteristic was of a type that could be easily predicted.

We claim:

1. A pressure sensor comprising:
   a housing;
   a diaphragm; and
   capacitor electrodes,
   whereby said housing and diaphragm have an expanded shape and are constructed of an electrically isolating material, and wherein said capacitor electrodes are located on the inner surfaces of said housing and diaphragm, and wherein the outer surfaces of said housing and said diaphragm are substantially parallel to the capacitor electrodes, said outer surfaces being coated with a conducting material, characterized in that in said outer surfaces of said housing a recess is arranged, said recess walls and bottom also being coated with a conductive material.

2. A pressure sensor according to claim 1, characterized in that the recess is larger laterally than the adjacent capacitor electrode.

3. A pressure sensor according to claim 1 or 2, characterized in that the bottom surface of said recess is essentially parallel to the capacitor electrodes.

4. A pressure sensor according to claim 1, 2 or 3 characterized in that the conducting material is connected to ground.

* * * * *

UNITED STATES PATENT AND TRADEMARK OFFICE
CERTIFICATE OF CORRECTION

PATENT NO. : 4,935,841

DATED : Jun. 19, 1990

INVENTOR(S) : Staffan Jonsson and Ray Olsson

It is certified that error appears in the above - identified patent and that said Letters Patent is hereby corrected as shown below:

On the title page, correct the PCT data to read:
   [22] PCT Filed: Feb. 11, 1988

Signed and Sealed this

Eleventh Day of June, 1991

Attest:

HARRY F. MANBECK, JR.

*Attesting Officer*     *Commissioner of Patents and Trademarks*